United States Patent [19]
Manes et al.

[11] Patent Number: 5,848,872
[45] Date of Patent: Dec. 15, 1998

[54] APPARATUS FOR HANDLING CARTRIDGES IN A STORAGE LIBRARY SYSTEM

[75] Inventors: Joseph P. Manes, Arvada; David Black, Thornton, both of Colo.

[73] Assignee: Storage Technology Corporation, Louisville, Colo.

[21] Appl. No.: 751,183

[22] Filed: Nov. 15, 1996

[51] Int. Cl.$^6$ ................................................. B65G 63/00
[52] U.S. Cl. ...................... 414/753; 414/280; 294/116; 901/39; 901/36
[58] Field of Search ..................................... 414/417, 280, 414/753, 661; 294/116; 369/36; 360/92, 99.02, 99.06; 901/36, 39

[56] References Cited

U.S. PATENT DOCUMENTS

| | | | |
|---|---|---|---|
| 4,614,474 | 9/1986 | Sudo | 414/280 |
| 4,903,252 | 2/1990 | Tanaka et al. | 369/36 |
| 4,918,548 | 4/1990 | O'Donnell et al. | 360/92 |
| 5,226,779 | 7/1993 | Yeakley . | |
| 5,236,296 | 8/1993 | Ostwald . | |
| 5,242,259 | 9/1993 | Yeakley . | |
| 5,277,540 | 1/1994 | Helms et al . | |
| 5,303,034 | 4/1994 | Carmichael et al. . | |
| 5,321,353 | 6/1994 | Furness . | |
| 5,323,327 | 6/1994 | Carmichael et al. . | |
| 5,331,232 | 7/1994 | Moy et al. . | |
| 5,402,283 | 3/1995 | Yamakawa et al. | 360/92 |
| 5,418,664 | 5/1995 | Ostwald . | |
| 5,421,697 | 6/1995 | Ostwald | 901/901 |
| 5,456,569 | 10/1995 | Cheatham et al. . | |
| 5,479,581 | 12/1995 | Kleinschnitz . | |
| 5,487,579 | 1/1996 | Woodruff | 414/743 |
| 5,588,796 | 12/1996 | Ricco et al. | 414/751 |
| 5,632,785 | 5/1997 | Dang et al. | 360/92 |
| 5,691,859 | 11/1997 | Ulrich et al. | 360/92 |
| 5,746,464 | 5/1998 | Paul | 294/116 |

*Primary Examiner*—Thomas J. Brahan
*Attorney, Agent, or Firm*—Brooks & Kushman, P.C.

[57] ABSTRACT

An apparatus for handling a cartridge having a cartridge notch formed therein in a storage library system includes a hand frame adapted for receiving cartridges and a reach carriage assembly movable along the hand frame assembly. A latch arm assembly is pivotally connected to the reach carriage assembly and includes a latch tooth thereon for selectively engaging the cartridge notch. The latch arm assembly is pivotally movable between a latching position, wherein the tooth is positioned for engagement in the notch, and a put position wherein the latch arm is positioned for pushing the cartridge out of the hand frame. Cam devices are provided for pivoting the latch arm assembly between the put position and latching position.

15 Claims, 7 Drawing Sheets

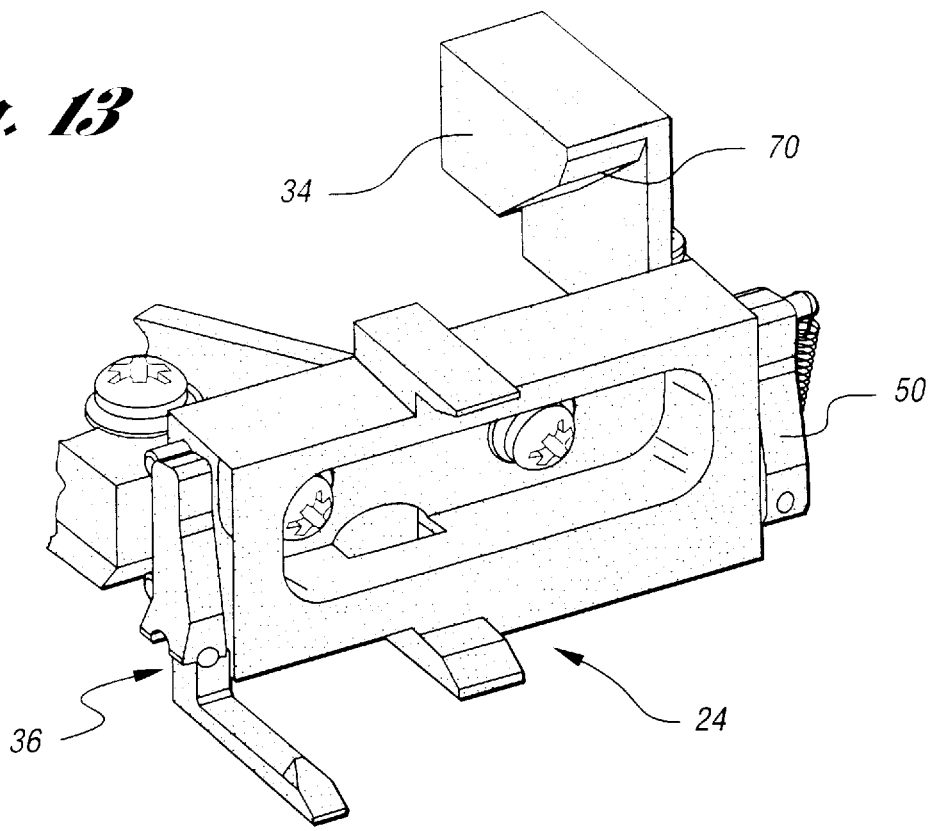
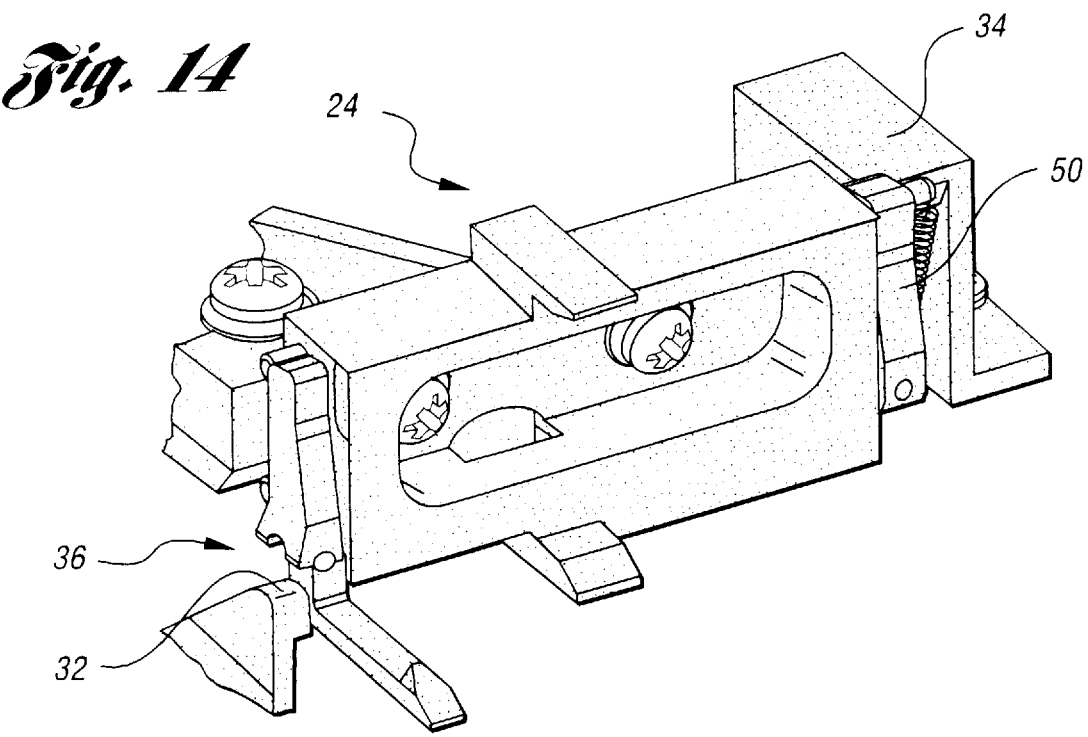

ary system in which the grasping mechanism of the hand is operated mechanically, rather than electrically, thereby eliminating the prior art solenoid.

The above object and other objects, features and advantages of the present invention are readily apparent from the following detailed description of the best mode for carrying out the invention when taken in connection with the accompanying drawings.

APPARATUS FOR HANDLING CARTRIDGES IN A STORAGE LIBRARY SYSTEM

TECHNICAL FIELD

This invention relates to a hand for a storage library system capable of grasping and manipulating multiple storage media cartridges.

BACKGROUND OF THE INVENTION

Storage library systems are capable of storing and rapidly retrieving large quantities of information stored on storage media cartridges. Such storage library systems often use robotic mechanisms to improve the speed of information retrieval and the reliability of maintaining the storage library cartridge inventory. These robotic mechanisms typically comprise a hand mechanism positioned on a movable arm. To retrieve information, the robotic arm is moved to position the hand near the inventory location of a desired media cartridge. The hand is then activated to grip the desired cartridge and remove it from the library inventory location. The robotic arm with the hand gripping the cartridge then moves to an appropriate position to further process the cartridge. In this manner, the robotic hand manipulates the cartridge for access to information stored on the cartridge.

The hand typically comprises a gripper mechanism for grasping the cartridge which includes solenoid-operated opposing gripper plates which act against a spring load. The spring load biases the gripper plates to a closed position for grasping cartridges, and the solenoid is selectively actuated for opening the gripper plates against the spring force. One such device is described in U.S. Pat. No. 5,418,664. Although these mechanisms work quite well, the solenoid introduces added weight to the hand assembly, and the electronics, software and hardware associated with running the gripper mechanism may be costly. The assembly also includes power cables which add weight to the assembly. Another disadvantage is the power consumption inherent in such a solenoid system.

It is desirable to provide a cartridge grasping assembly which does not require the solenoid mechanism and related electronics for opening and closing the gripper.

DISCLOSURE OF THE INVENTION

The present invention overcomes the above-referenced shortcomings of prior art assemblies by providing an apparatus for handling a cartridge in a storage library system which includes a mechanical latch arm assembly for grasping cartridges. The latch arm assembly is cam-actuated for pivoting between a "latching" position for engaging the cartridge, and a "put" position for pushing the cartridge out of the hand assembly.

More specifically, the present invention provides an apparatus for handling a cartridge having a cartridge notch formed therein in a storage library system. The apparatus includes a hand frame adapted for receiving cartridges, and a reach carriage assembly movable along the hand frame assembly. A latch arm assembly is pivotally connected to the reach carriage assembly and includes a latch tooth thereon for selectively engaging the cartridge notch. The latch arm is pivotally movable between a latching position, wherein the tooth is positioned for engagement in the notch, and a put position wherein the latch arm is positioned for pushing the cartridge out of the hand frame.

Accordingly, an object of the present invention is to provide an apparatus for handling a cartridge in a storage

BRIEF DESCRIPTION OF THE DRAWINGS

FIG. 13 shows a cutaway perspective view of a reach carriage assembly and cam block, with the latch assembly in the latching position;

FIG. 14 shows a cutaway perspective view of a reach carriage assembly and cam block, with the latch assembly engaging the cam block.

DETAILED DESCRIPTION OF THE BEST MODE FOR CARRYING OUT THE INVENTION

Figure 1:
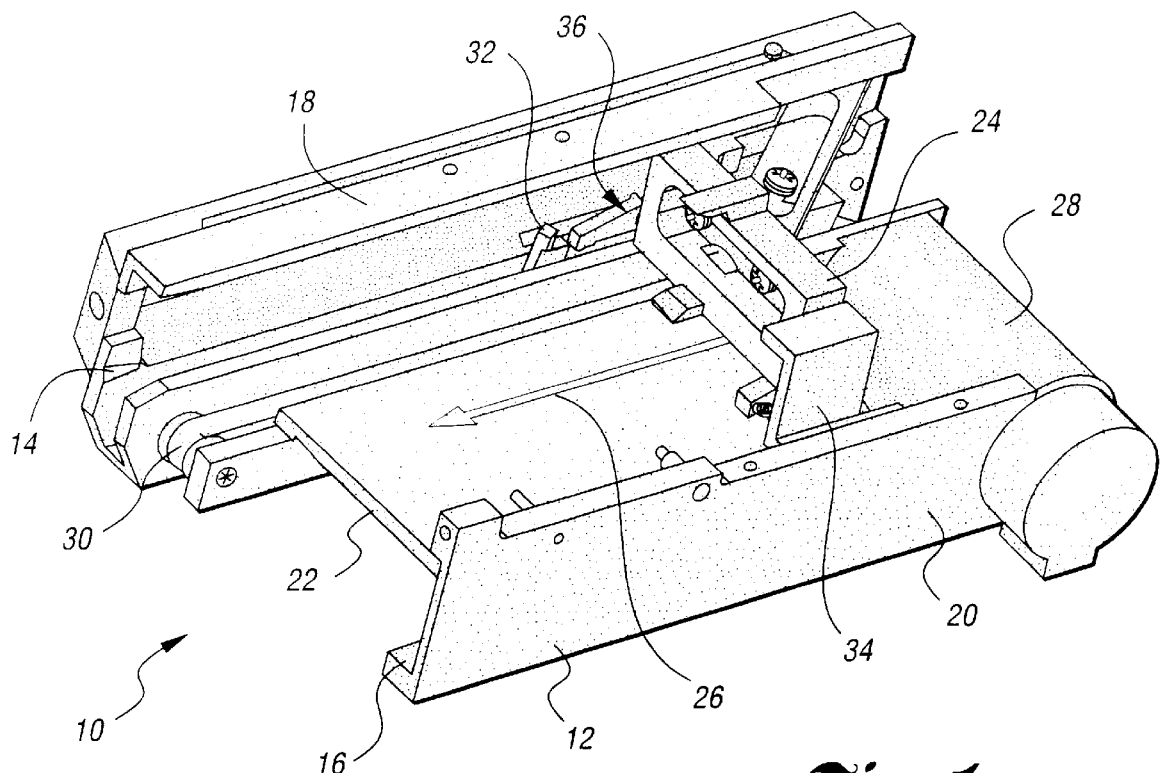
FIG. 1 shows a perspective view of a hand assembly in accordance with the present invention.

A hand apparatus 10 for handling a cartridge in a storage library system is shown in FIG. 1. The apparatus 10 includes a hand frame 12 adapted for receiving cartridges. The hand frame 12 includes tape cartridge lead-in features 14, 16, and opposing rails 18, 20 supported by a base 22 for capturing a cartridge.

The apparatus 10 also includes a reach carriage assembly 24 which is movable along the hand frame 12 in the direction shown by arrow 26, and in the opposing direction. A motor 28 is provided for moving the reach carriage assembly 24 by means of the timing belt/pulley 30.

A first cam member 32 and cam block 34 are mounted to the hand frame 12 for pivoting the latch assembly 36 as the reach carriage assembly 24 is moved back and forth along the hand frame 12.

Figure 2:
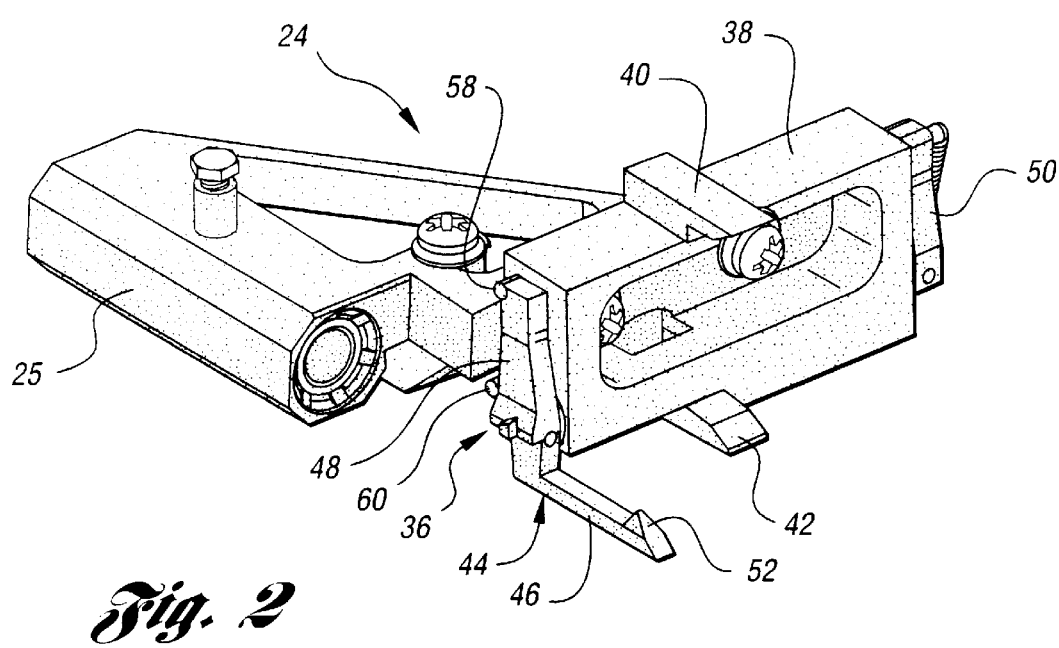
FIG. 2 shows a perspective view of a reach carriage assembly in accordance with the present invention.

Turning to FIG. 2, the reach carriage assembly 24 comprises a linear bearing block 25 which carries the carriage face block 38. The carriage face block 38 includes fixed fingers 40, 42, and includes an aperture formed therethrough (not shown) for pivotally supporting the latch assembly 36.

Figure 3:
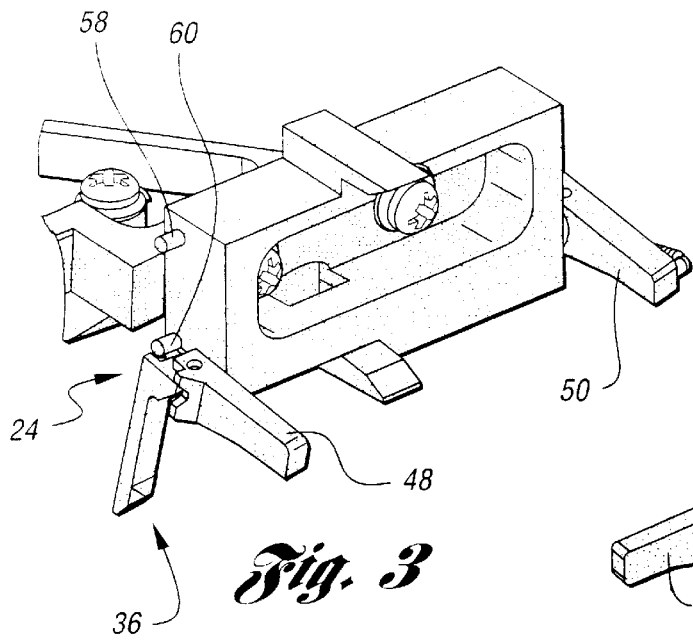
FIG. 3 shows a cutaway perspective view of the reach carriage assembly of FIG. 2.
Figure 5:
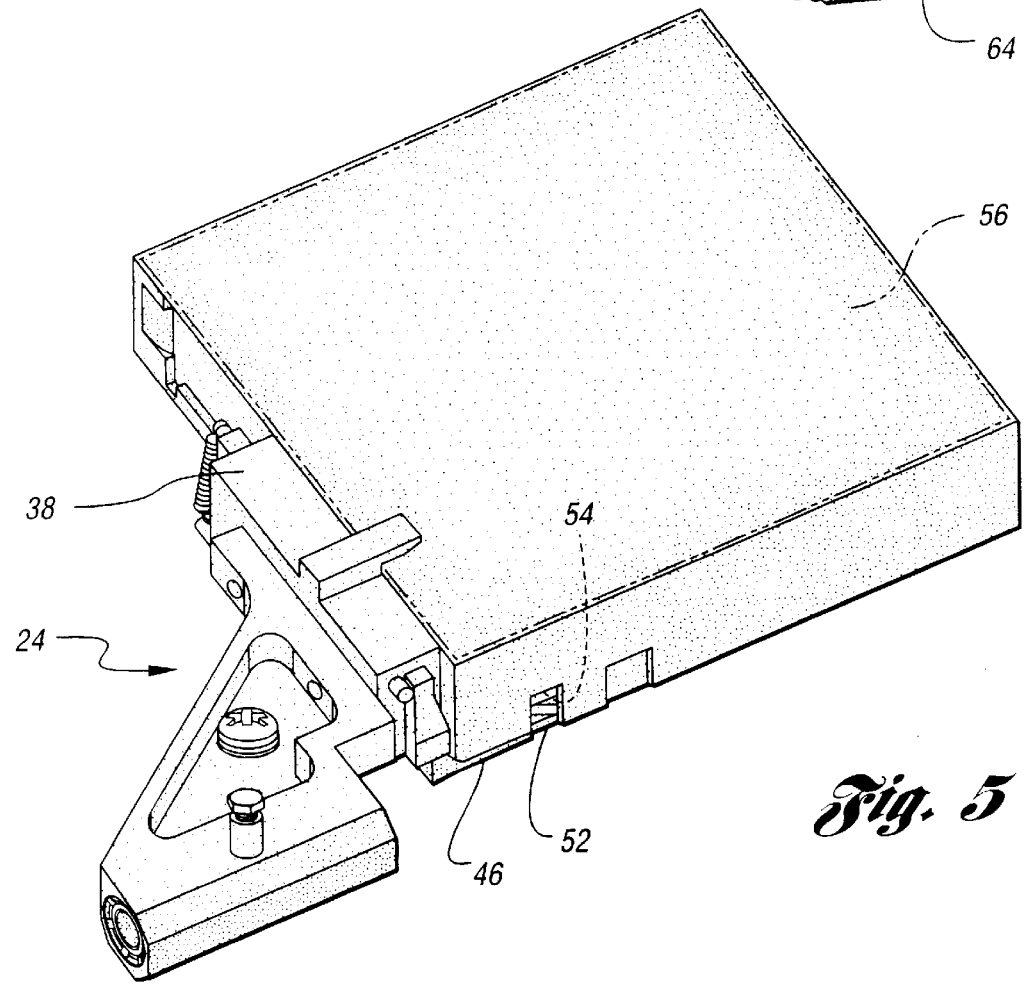
FIG. 5 shows a perspective view of a reach carriage assembly grasping a cartridge in the "latched" position.

The latch assembly 36 comprises a substantially L-shaped latch member 44, which includes first and second arms 46, 48, respectively. The latch assembly 36 also includes a rod (not shown) which extends through the aperture in the carriage face block 38 and connects to the third arm 50 at the opposing end of the carriage face block 38. The first arm 46 includes a tooth 52 thereon for selective engagement within the notch 54 in the cartridge 56, as shown in FIG. 5. The carriage face block 38 also includes first and second stop pins 58, 60, as shown in FIG. 3. The stop pins 58, 60 are adapted to engage the first and second arms 46, 48 for preventing pivotal movement of the latch assembly 36 beyond the put position or the latching position. The latch assembly 36 is rotatable 102° between the stop pins 58, 60.

The carriage face block 38 further includes a spring pin 62 extending therefrom for supporting an overcenter spring 64, which is connected at its opposing end to the third arm 50. The overcenter spring 64 holds the latch assembly 36 in the respective put position or pushing position.

Figure 4:
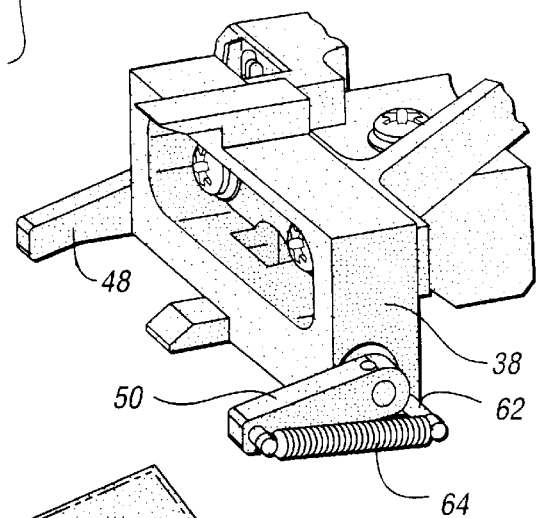
FIG. 4 shows a reverse cutaway perspective view of the reach carriage assembly of FIG. 3.

FIGS. 3 and 4 show the latching assembly in the put position with the arms 48, 50 positioned for pushing the carriage out of the hand assembly.

Figure 6:
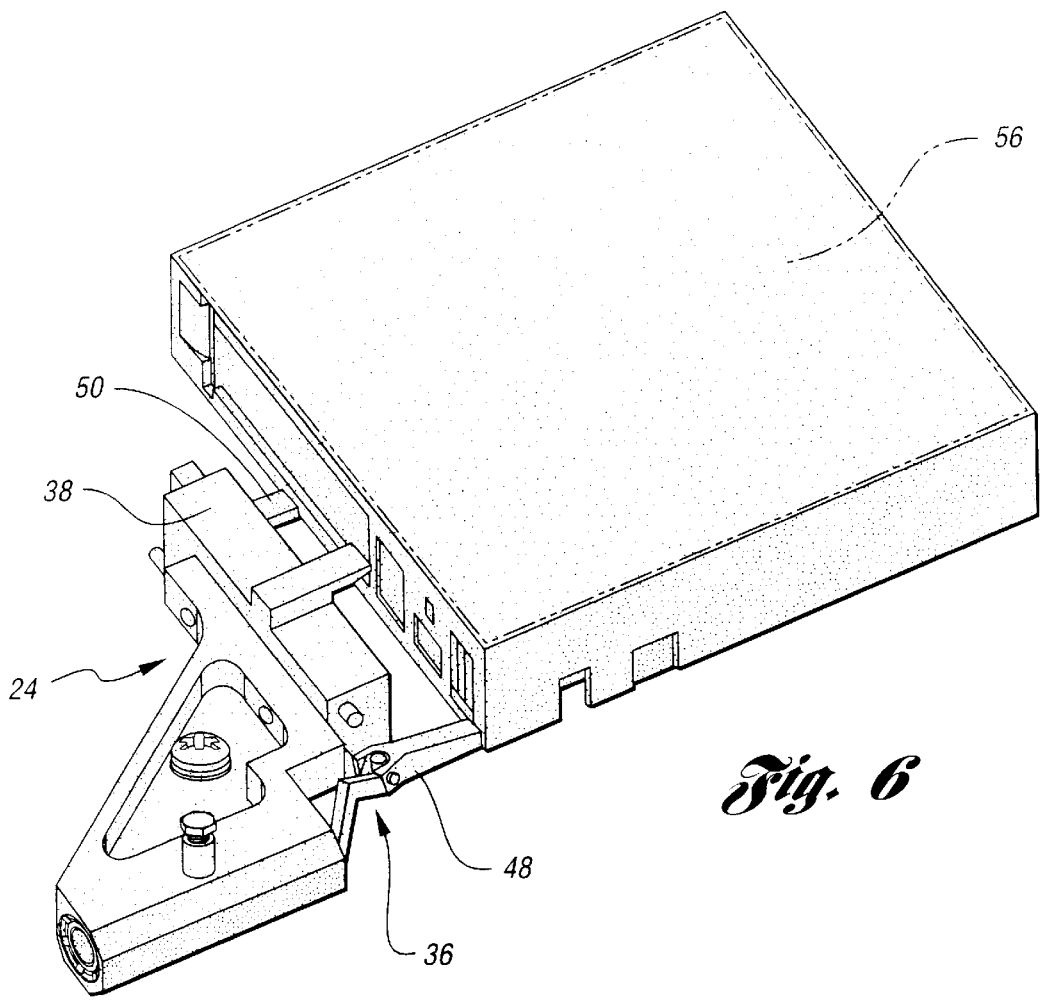
FIG. 6 shows a perspective view of a reach carriage assembly engaging a cartridge in the "put" position.

As shown in FIG. 5, the reach carriage assembly 24 may grasp and manipulate the cartridge 56 when the tooth 52 of the arm 46 is engaged within the notch 54 of the cartridge 56. As shown in FIG. 6, with the arms 48, 50 in the put position, the arms 48, 50 are positioned to push against the cartridge 56 for pushing the cartridge 56 out of the hand frame 12.

Figure 7:
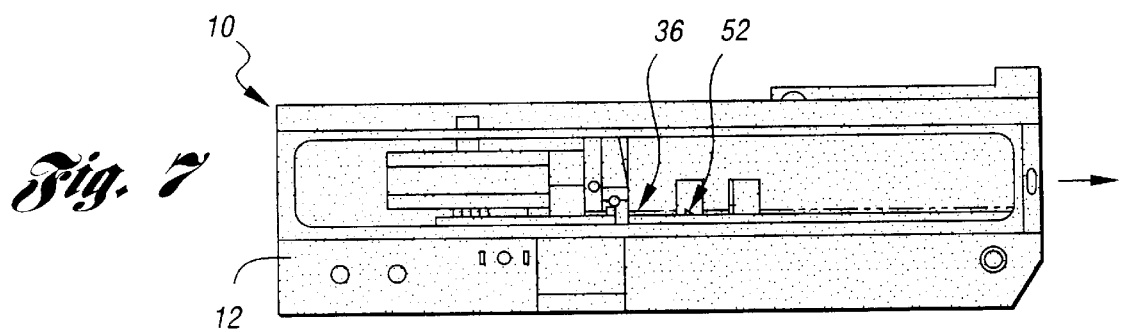
FIG. 7 shows a side view of a hand frame assembly with the latch assembly in the "get" position.
Figure 8:
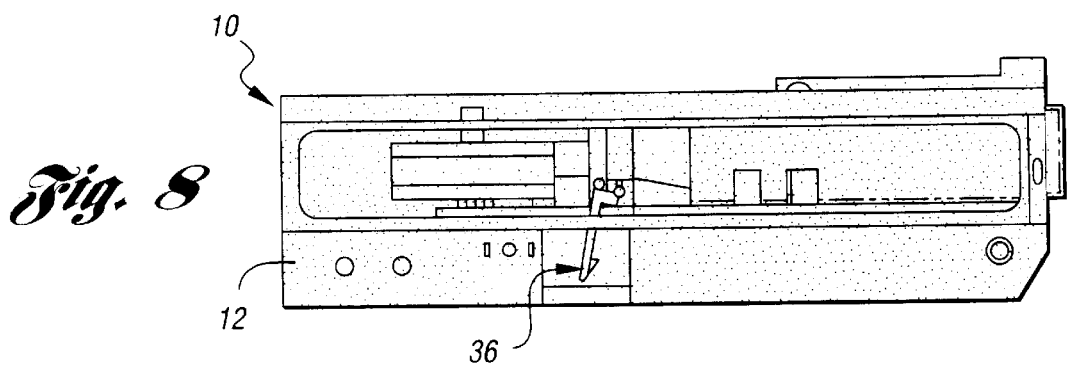
FIG. 8 shows a side view of a hand frame assembly with the latch assembly in the "put" position.

FIG. 7 shows a side view of the apparatus 10 with the latch assembly 36 in the latching or "get" position for advancing forward to grasp a cartridge. FIG. 8 shows a side view of the apparatus 10 with the latch arm assembly 36 in the push position for pushing the cartridge out of the hand frame 12.

Figure 9:
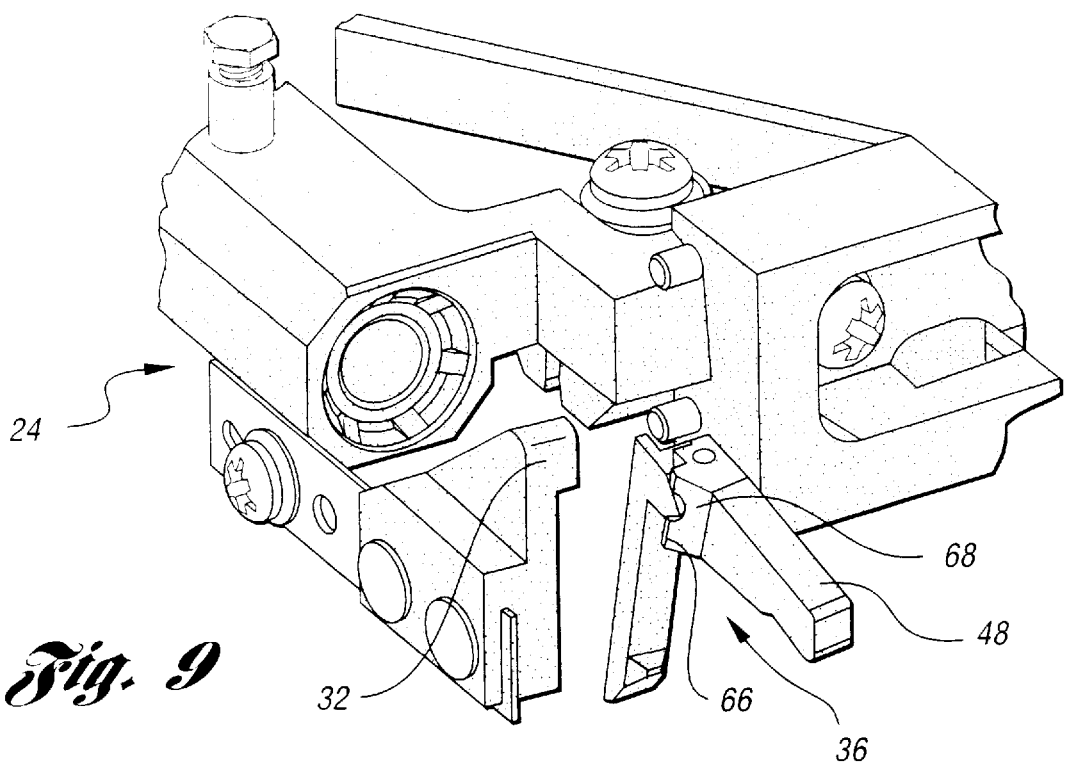
FIG. 9 shows a cutaway perspective view of a reach carriage and latch assembly, with the latch assembly moving toward the first cam member.
Figure 10:
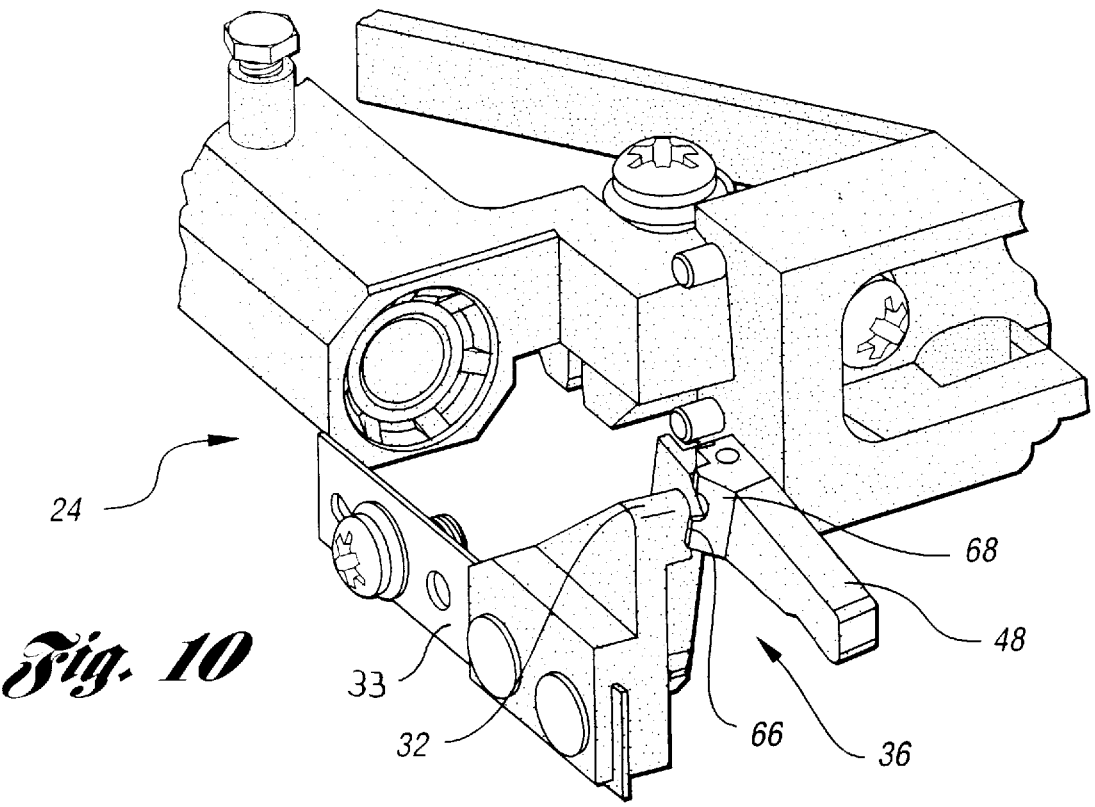
FIG. 10 shows a cutaway perspective view of the reach carriage and latch assembly as shown in FIG. 9, with the latch assembly engaging the first cam member.
Figure 11:
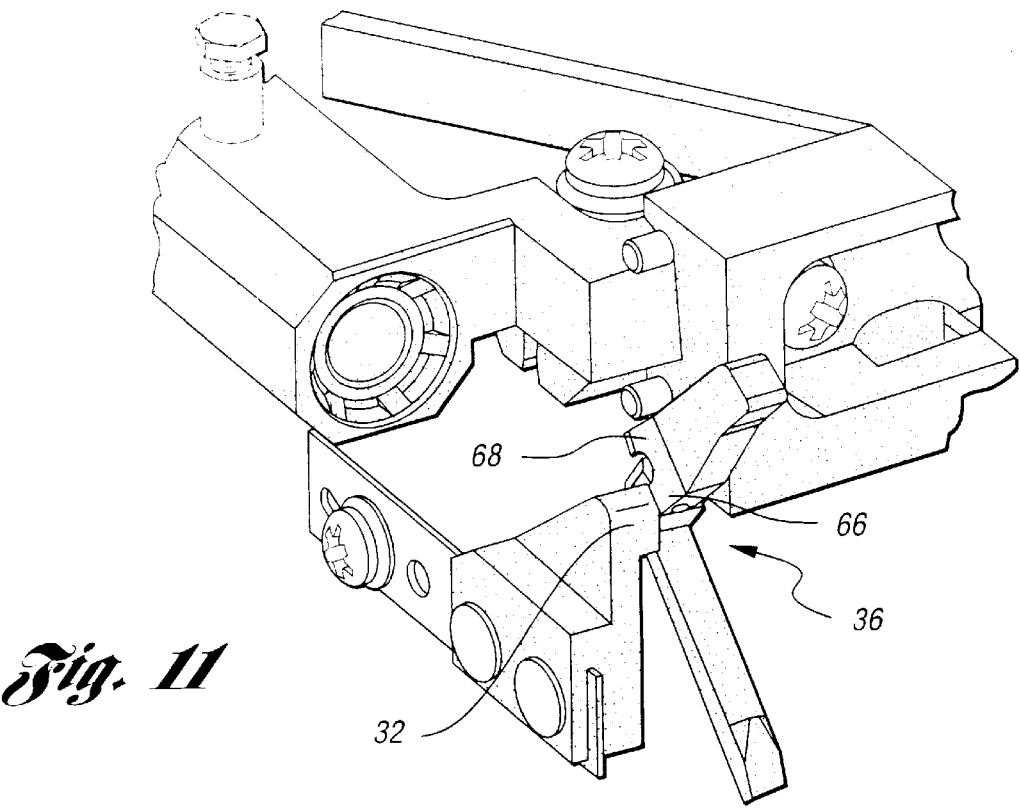
FIG. 11 shows a cutaway perspective view of the reach carriage and latch assembly, with the latch assembly being pivoted by the first cam member.
Figure 12:
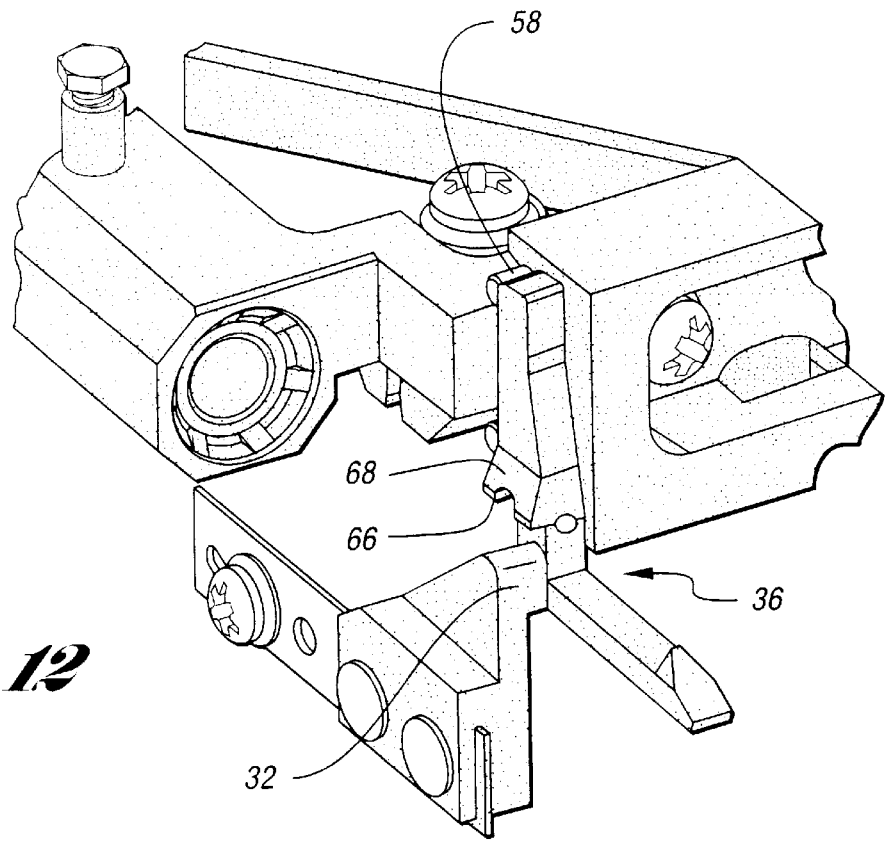
FIG. 12 shows a cutaway perspective view of the reach carriage and latch assembly, with the latch assembly having been pivoted to the latching position by the first cam member.

FIGS. 9–12 illustrate sequential steps for resetting the latch arm assembly 36 to the latching position or "get" position. In FIG. 9, the reach carriage assembly 24 moves away from the cartridge cell toward the first cam member 32. The second arm 48 includes a second cam member 66 which is engageable with the first cam member 32 for pivoting the latch arm assembly 36. FIG. 10 shows the second cam member 66 engaging the first cam member 32 as the reach carriage assembly 24 continues to move. FIG. 11 shows the first cam member 32 engaging the second cam member 66 for causing rotation of the latching mechanism 36. FIG. 12 shows the latch arm assembly 36 rotated against the first stop pin 58 so that the latch arm assembly 36 is in the latching position. The spring 64 (see FIG. 4) on the opposing end of the carriage face block holds the latch arm assembly 36 in the latching position against the first stop pin 58. The linear reach motion stops at this point.

The first cam member 32 is connected to a flexible flat spring component 33, so that the first cam member 32 will flex away from the second cam member 66 as it moves up the ramp 68 on the opposing side of the second cam member 66 when the reach carriage assembly 24 is moved toward a cartridge with the latch assembly 36 in the put position. Accordingly, as a result of this flexibility, the first cam member 32 does not interfere with such movement.

Figure 15:
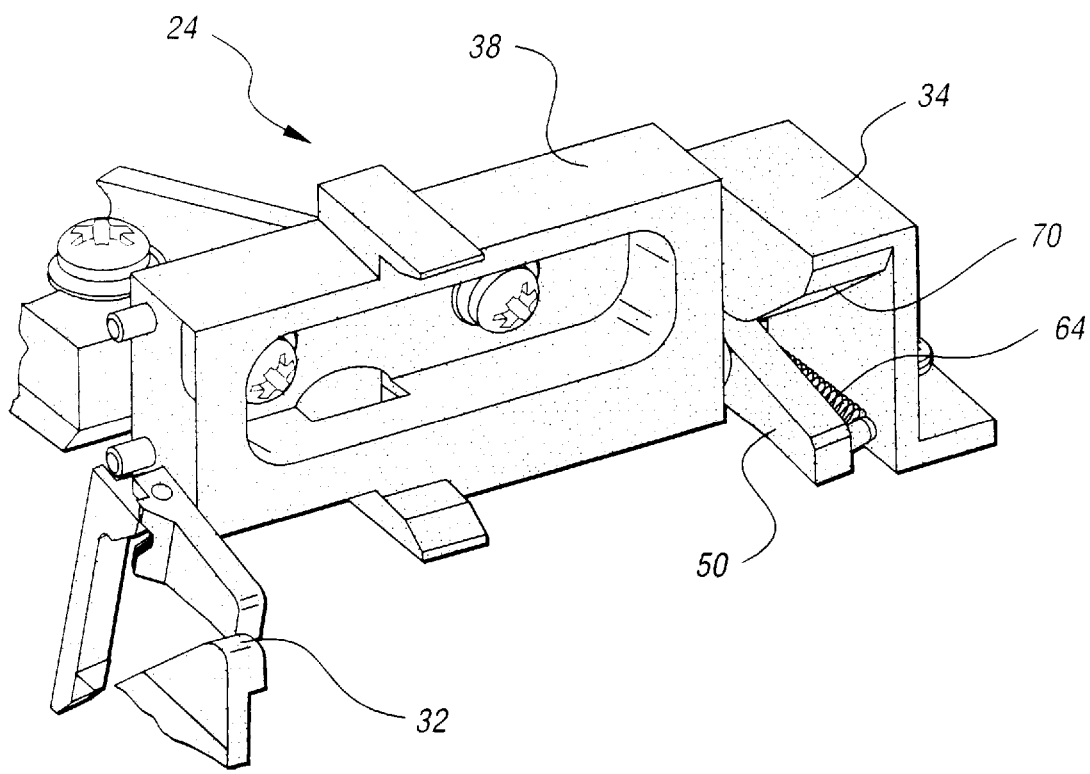
FIG. 15 shows a cutaway perspective view of a reach carriage assembly, with the latch assembly having been pivoted to the "put" position by the cam block.

FIGS. 13–15 illustrate sequential steps for resetting the latch arm assembly 36 to the put position. FIG. 13 shows the reach carriage assembly 24 moving away from the cartridge cell (not shown) toward the cam block 34, which is fixed to the base 22. The cam block 34 includes a cam surface 70 which is engageable with the third arm 50 of the latch assembly 36 for pivoting the latch assembly 36 to the put position. FIG. 14 shows the third arm 50 making initial contact with the cam surface 70 of the cam block 34, and FIG. 15 shows the third arm 50 moved to the put position by the cam surface 70 of the cam block 34 acting in concert with the overcenter spring 64.

Accordingly, with this configuration, the latch arm assembly 36 may be easily pivoted between the put position and latching position for selectively engaging cartridges or pushing cartridges out of the hand frame 12. Therefore, the solenoid, cables, electronics and associated software and hardware of the prior art systems are all eliminated with the present invention.

While the best mode for carrying out the invention has been described in detail, those familiar with the art in which this invention relates will recognize various alternative designs and embodiments for practicing the invention within the scope of the appended claims.

What is claimed is:

1. An apparatus for handling a cartridge having a cartridge notch formed therein in a storage library system, comprising:

a hand frame adapted for receiving cartridges;

a reach carriage assembly movable along said hand frame assembly; and a latch arm assembly pivotally connected to said reach carriage assembly and having a latch tooth thereon for selectively engaging the cartridge notch, wherein the latch arm assembly is pivotally movable within a pivotal range of approximately 90° between a latching position in which the tooth is positioned for engagement in the notch, and a put position in which the latch arm assembly is positioned for pushing the cartridge out of the hand frame, wherein said latching position and put position define opposing ends of said pivotal range.

2. The apparatus of claim 1, wherein said latch arm assembly comprises a substantially L-shaped latch member having first and second arms, said first arm comprising said tooth, and said second arm adapted for pushing the cartridge when the latch arm assembly is in the put position.

3. The apparatus of claim 2, wherein said reach carriage assembly comprises a carriage face block having an aperture formed therethrough, and said latch arm assembly further comprises a third arm and a rod extending through said aperture, said rod having a first end connected to said latch member and a second end connected to said third arm.

4. The apparatus of claim 3, further comprising:

a first cam member extending from the hand frame; and a second cam member extending from the second arm for selective engagement with said first cam member for engaging and pivoting the latch arm assembly from the put position to the latching position when the carriage assembly is moved in a first direction.

5. The apparatus of claim 4, wherein the second cam member comprises a ramp surface and the first cam member comprises a flexible material to facilitate bending movement over said ramp surface when the carriage is moved in a second direction opposite the first direction.

6. The apparatus of claim 5, further comprising:

a spring pin extending from said carriage face block;

an over-center spring extending between said spring pin and said third arm for holding the latch arm assembly in position; and a cam block secured to the hand frame and engageable with said third arm for pivoting the latch arm assembly from the latching position to the put position.

7. The apparatus of claim 6, further comprising first and second stop pins extending from the carriage face block for stopping pivotal movement of the substantially L-shaped latch member in the latching position and put position, respectively.

8. An apparatus for grasping a cartridge having a cartridge notch formed therein in a storage library system including a hand frame adapted for receiving such cartridge and a reach carriage assembly including a carriage face block movable along the hand frame assembly, the apparatus comprising:

a latch arm assembly connected to the reach carriage assembly and having a latch tooth thereon for selectively engaging the cartridge notch, wherein the latch arm assembly is pivotally movable between a latching position in which the tooth is positioned for engagement in the notch, and a put position in which the latch arm assembly is positioned for pushing the cartridge out of the hand frame, and an over-center spring operatively connected between the reach carriage assembly and the latch arm assembly for alternatively biasing the latch arm assembly toward the latching and put positions.

9. The apparatus of claim 8, wherein said latch arm assembly comprises a substantially L-shaped latch member having first and second arms, said first arm comprising said tooth, and said second arm adapted for pushing the cartridge when the latch arm assembly is in the put position.

10. The apparatus of claim 9, wherein said latch arm assembly further comprises a third arm and a rod extending through the carriage face block, said rod having a first end connected to said latch member and a second end connected to said third arm.

11. The apparatus of claim 10, further comprising:

a first cam member extending from the hand frame; and a second cam member extending from the second arm for selective engagement with said first cam member for engaging and pivoting the latch arm assembly from the put position to the latching position when the carriage assembly is moved in a first direction.

12. The apparatus of claim 11, wherein the second cam member comprises a ramp surface and the first cam member comprises a flexible material to facilitate bending movement over said ramp surface when the carriage is moved in a second direction opposite the first direction.

13. The apparatus of claim 12, further comprising:

a spring pin extending from the carriage face block;

said over-center spring extending between said spring pin and said third arm for holding the latch arm assembly in position; and a cam block secured to the hand frame and engageable with said third arm for pivoting the latch arm assembly from the latching position to the put position.

14. The apparatus of claim 13, further comprising first and second stop pins extending from the carriage face block for stopping pivotal movement of the substantially L-shaped latch member in the latching position and put position, respectively.

15. An apparatus for handling a cartridge having a cartridge notch formed therein in a storage library system, comprising:

a hand frame adapted for receiving cartridges, with a first cam member extending from the hand frame and a cam block secured to the hand frame;

a reach carriage assembly movable along said hand frame assembly; and a latch arm assembly pivotally connected about a horizontal axis to said reach carriage assembly and having a latch tooth thereon for selectively engaging the cartridge notch, wherein the latch arm assembly is pivotally movable between a latching position in which the tooth is positioned for engagement in the notch, and a put position in which the latch arm assembly is positioned for pushing the cartridge out of the hand frame, said first cam member being engageable with the latch arm assembly for pivoting the latch arm assembly from the put position to the latching position, and said cam block being engageable with the latch arm assembly for causing pivotal movement of the latch arm assembly from the latching position to the put position.

* * * * *